May 5, 1959 A. R. D'HEEDENE 2,885,492
REPEATER SYSTEMS EMPLOYING NON-RECIPROCAL COUPLING DEVICES
Filed Aug. 30, 1952 2 Sheets-Sheet 1
FIG. 1
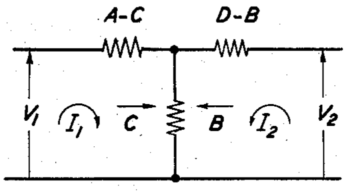
FIG. 2
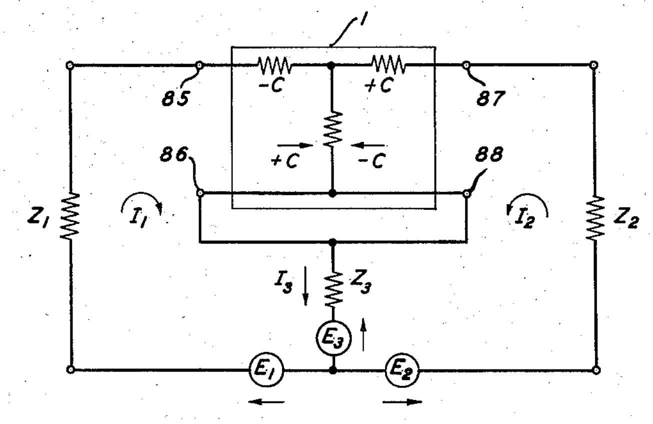
FIG. 3
$Z_1$ TRANSMITS TO $Z_2$ NOT TO $Z_3$
$Z_2$ TRANSMITS TO $Z_3$ NOT TO $Z_1$
$Z_3$ TRANSMITS TO $Z_1$ NOT TO $Z_2$
FIG. 4
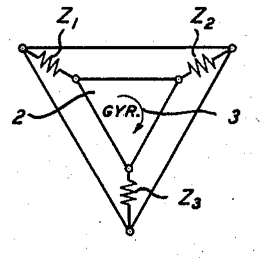
INVENTOR
A. R. D'HEEDENE
BY Franklin Mohr
ATTORNEY May 5, 1959 A. R. D'HEEDENE 2,885,492

REPEATER SYSTEMS EMPLOYING NON-RECIPROCAL COUPLING DEVICES

Filed Aug. 30, 1952 2 Sheets-Sheet 2

INVENTOR
A. R. D'HEEDENE
BY Franklin Mohr
ATTORNEY

United States Patent Office 2,885,492

Patented May 5, 1959

2,885,492

REPEATER SYSTEMS EMPLOYING NON-RECIPROCAL COUPLING DEVICES

Albert R. D'Heedene, Madison, N.J., assignor to Bell Telephone Laboratories, Incorporated, New York, N.Y., a corporation of New York Application August 30, 1952, Serial No. 307,281

11 Claims. (Cl. 179—170)

This invention relates to circuit arrangements for interconnecting a plurality of transmission paths according to a desired scheme while substantially preventing one or more undesired interconnections. It relates more particularly to non-reciprocal and antireciprocal interconnectors, coupling devices or couplers and is illustrated in its application to a two-way repeater arrangement.

An object of the invention is to interconnect three circuit elements, or transmission paths $Z_1$, $Z_2$, $Z_3$, so that a source of electromagnetic waves associated with $Z_1$ actuates $Z_2$, but not $Z_3$; a source associated with $Z_2$ actuates $Z_3$, but not $Z_1$; and a source associated with $Z_3$ actuates $Z_1$, but not $Z_2$, and to accomplish this result with little or no power loss.

A more specific object of the invention is to interconnect a transmission line at a repeating station with the output of one amplifier and the input of another amplifier in such a way that the output of the first amplifier will transmit to the line and the line will transmit to the input of the second amplifier but the output of the first amplifier will not transmit to the input of the second amplifier and to accomplish this result without the power loss occasioned by devices such as a line-balancing network as employed in the usual two-way repeater station using hybrid coils.

A further object is to interconnect a plurality of transmission paths or circuit elements in such a way that maximum power transfer will occur between certain transmission paths or between certain selected pairs of elements while transmission is substantially prevented between certain other selected paths or pairs of elements.

In the drawing, Fig. 1 is a generalized circuit diagram of a non-reciprocal T-network of a type that is useful in explaining the principles of the invention;

Fig. 2 is a schematic representation of an antireciprocal network in circuit with three reciprocal or ordinary impedance elements and three sources of electromotive force;

Fig. 3 is a tabular representation of the scheme of interconnections obtainable in circuits embodying the invention such as the circuit of Fig. 2;

Fig. 4 is a simplified schematic of the circuit of Fig. 2 arranged to exhibit a three-fold symmetry in the circuit;

Figure 5:
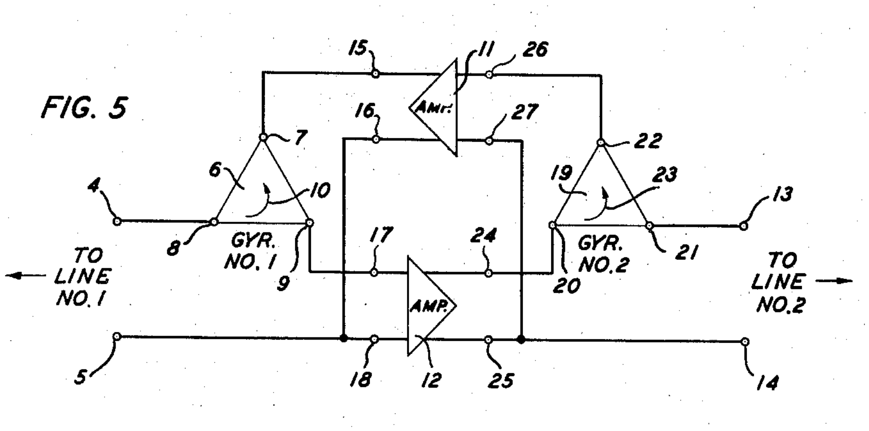
Fig. 5 is a schematic representation of a two-way repeater arrangement embodying the invention.

To facilitate the explanation of the principles of the invention the following exposition is offered, based upon consideration of a linear passive system with two pairs of accessible terminals, such as may be specified by two equations as follows:

$$V_1=AI_1+BI_2 \quad (1)$$
$$V_2=CI_1+DI_2 \quad (2)$$

in which $V_1$ and $V_2$ are the voltages across the respective pairs of terminals, $I_1$ and $I_2$ are the currents flowing through the respective pairs of terminals, and A, B, C, D, are impedances which are characteristic of the linear passive system, B and C being transfer impedances. Any or all of the symbols $V_1$, $V_2$, $I_1$, and $I_2$ in Equations (1) and (2) may have values that are represented by complex numbers as required by an alternating-current system, or on the other hand the equations are also applicable to a direct-current system.

In general, a linear passive system may or may not be governed by the well-known theorem of reciprocity. A system that is governed by that theorem is called a reciprocal system. Systems that are not thus governed are termed non-reciprocal. A reciprocal system is characterized by having the transfer impedances B and C equal. A non-reciprocal system in which B and C are equal and both real but of opposite algebraic sign is termed antireciprocal.

A linear passive system as specified in Equations (1) and (2) may be represented by an equivalent network such as shown in Fig. 1 having two branches with values A–C and D–B, respectively, of ordinary nature which are not altered or affected by the direction of power transfer through the system. The third branch of the equivalent T-network is double-valued depending upon the direction of power transfer. In accordance with these values, the current $I_2$ transfers into the first network mesh (the one containing the current $I_1$) an electromotive force $BI_2$, while the current $I_1$ transfers into the second network mesh (the one containing the current $I_2$) an electromotive force $CI_1$. Thus, we are here concerned with a non-reciprocal system. In its function also as a self impedance the third branch is double-valued. The total self impedance of the first mesh is $A-C+C$, or A, while the total self impedance of the second mesh is $D-B+B$, or D.

Of considerable interest in relation to the present invention is a special case of the non-reciprocal network of Fig. 1 which appears within a box 1 in Fig. 2, having accessible terminals or electrodes 85, 86, 87, 88. This is a system in which A and D are each zero and B is the negative of C, where C is a positive real number. Making these substitutions in Equations (1) and (2) we have $$V_1=-CI_2 \quad (3)$$
$$V_2=CI_1 \quad (4)$$

and a corresponding equivalent network, as shown in Fig. 2 has one branch (−C), one branch C, and one branch which has the value C for the current $I_1$ and the value (−C) for the current $I_2$. This device thus has two values of transfer impedance, namely, plus C for transfers from the first mesh to the second and minus C for transfers from the second mesh to the first, and is of the class that has been termed an "ideal gyrator" by B. D. H. Tellegen in an article entitled "The Gyrator, a New Electric Network Element," in Philips Research Reports, volume 3, pages 81 to 101.

When combined with three external transmission paths the ideal gyrator may be used, in accordance with the invention, to produce a system that is capable of transmitting power selectively from a source associated with the first external path to the second external path without transmitting any power to the third external path. The combination, moreover, is capable of transmitting power from a source associated with the second external path to the third external path without transmitting any power to the first external path. Finally, the combination is capable of transmitting power from a source associated with the third external path to the first external path without transmitting any power to the second external path. This scheme of selective transmission is set forth in tabular form in Fig. 3, the external paths being designated $Z_1$, $Z_2$, and $Z_3$. The table defines a cyclical order of progression that is characteristic of the system.

It will be noted that it is not necessary that appreciable power be transferred in each case, it being sufficient in some instances that a source associated with one path shall actuate another path or element in some manner which may be merely to develop a voltage in the second path or element even though no material amount of current flows and no appreciable power is transferred.

Some actual gyrators sufficiently close to the ideal gyrator, when used in a system according to the invention, will have all the properties set forth in Fig. 3, while other actual gyrators will have some of these properties but not all.

An example of a use of the invention is in an otherwise conventional two-way repeater arrangement wherein the output circuit of a one-way amplifier is connected to transmit power into a transmission line and the input circuit of a second one-way amplifier is connected to the same transmission line to receive intelligence-bearing current or voltage therefrom in which case it is of prime importance that there be substantially no current or voltage transferred from the output circuit of the first amplifier to the input circuit of the second amplifier as such transfer would usually cause the repeater to break into self-oscillations and be rendered inoperative as a repeater.

In accordance with the invention the output circuit of the first amplifier may constitute either $Z_1$ or $Z_2$ or $Z_3$, the transmission line may constitute $Z_2$, $Z_3$ or $Z_1$, respectively, and the input of the second amplifier may constitute $Z_3$, $Z_1$ or $Z_2$, respectively, there being substantially no transfer between the output of the first amplifier and the input of the second amplifier. In the case of some actual gyrators it will be found necessary that the transmission line constitute $Z_3$, in which case the output of the first amplifier will constitute $Z_2$ and the input of the second amplifier will constitute $Z_1$ in accordance with the cyclical order of progression in the scheme of Fig. 3.

The properties of a system such as that shown in Fig. 2 may be demonstrated by means of the usual algebraic solution of the network shown in the figure. In the particular system shown in Fig. 2, the network in box 1 is essentially a three-terminal network with terminals 85, 87, 88, inasmuch as terminals 86 and 88 are common. The external elements $Z_1$, $Z_2$ and $Z_3$ are connected respectively to terminals 85, 87 and 88. Sources of electromotive force, $E_1$, $E_2$, $E_3$, which may be either alternating or direct-current sources, are shown connected in series with the respective elements $Z_1$, $Z_2$, $Z_3$, and are directed as to polarity as shown by the arrows adjacent to the sources in Fig. 2. The currents $I_1$ and $I_2$ are directed as shown by curved arrows adjacent to the reference characters, and whenever the actual currents are directed oppositely to the respective arrows the solution of the circuit equations comes out with a negative value for the current so directed, as is well known in circuit theory. The current $I_3$ which is the algebraic sum of $I_1$ and $I_2$ is shown symbolically.

The circuit equations are as follows:

$$E_1-E_3=(Z_3+Z_1)I_1+(Z_3-C)I_2 \quad (5)$$

$$E_2-E_3=(Z_3+C)I_1+(Z_2+Z_3)I_2 \quad (6)$$

The Equations 5 and 6 may be made to yield the solutions of each of three cases, hereinafter referred to as Cases I, II, and III, in which the system is energized respectively by an electromotive force in series with element $Z_1$, $Z_2$ or $Z_3$. The solutions of Equations 5 and 6 before specializing as to the three cases mentioned are as follows:

$$I_1=\frac{E_1(Z_2+Z_3)-E_2(Z_3-C)-E_3(Z_2+C)}{\Delta} \quad (7)$$

$$I_2=\frac{-E_1(Z_3+C)+E_2(Z_3+Z_1)-E_3(Z_1-C)}{\Delta} \quad (8)$$

and, for convenience, the current $I_3$ which is the sum of $I_1$ and $I_2$ is given:

$$I_1+I_2=I_3=\frac{E_1(Z_2-C)+E_2(Z_1+C)-E_3(Z_1+Z_2)}{\Delta} \quad (9)$$

where $$\Delta=Z_1Z_2+Z_2Z_3+Z_3Z_1+C^2 \quad (10)$$

In Case I, the electromotive force $E_1$ is active and $E_2$ and $E_3$ are both zero. Making these substitutions in Equations 7, 8 and 9 the results are:

*Case I*

$$I_1=\frac{E_1(Z_2+Z_3)}{\Delta} \quad (11)$$

$$I_2=-\frac{E_1(Z_3+C)}{\Delta} \quad (12)$$

$$I_3=\frac{E_1(Z_2-C)}{\Delta} \quad (13)$$

Similarly, in Case II the electromotive force $E_2$ is active and $E_3$ and $E_1$ are both zero, with the following results:

*Case II*

$$I_1=-\frac{E_2(Z_3-C)}{\Delta} \quad (14)$$

$$I_2=\frac{E_2(Z_3+Z_1)}{\Delta} \quad (15)$$

$$I_3=\frac{E_2(Z_1+C)}{\Delta} \quad (16)$$

Finally, in Case III the electromotive force $E_3$ is active and $E_1$ and $E_2$ are both zero, with the following results:

*Case III*

$$I_1=-\frac{E_3(Z_2+C)}{\Delta} \quad (17)$$

$$I_2=-\frac{E_3(Z_1-C)}{\Delta} \quad (18)$$

$$I_3=-\frac{E_3(Z_1+Z_2)}{\Delta} \quad (19)$$

In Case I it is desired that there be transmission from $Z_1$ to $Z_2$ and no transmission from $Z_1$ to $Z_3$. In order to assure that there be no transmission from $Z_1$ to $Z_3$ the current $I_3$ of Equation 13 must be zero. This condition is satisfied by making $Z_2$ equal to C, that is by matching the impedance of the element $Z_2$ to the transfer impedance C of the gyrator.

In Case II, where it is desired that there be no transmission from $Z_2$ to $Z_1$ the result is obtained by making $Z_3$ equal to C, as required by Equation 14.

In Case III, where it is desired that there be no transmission from $Z_3$ to $Z_2$, the result is obtained by making $Z_1$ equal to C, as required by Equation 18.

The general rule of the three cases is evidently that where transmission is desired from a first branch of the network of Fig. 2 to a second branch and not to the third branch, the impedance in the second branch must be made conjugate to the transfer impedance of the gyrator. The rule holds no matter which branch is designated as the first branch as long as the branches are numbered in rotation always in the same direction. In the system of Fig. 2 this direction is clockwise around the closed loop constituted by $Z_1$, Box 1, $Z_2$ and $Z_3$. It will appear in the course of the exposition that the direction of progression in a given system can be reversed, if desired, by suitable means characteristic of a specific gyrator.

Account may be taken of dissipation of energy in the gyrator, in which case A and B will not be zero-valued. Since, however, A is in series with $Z_1$ and D is in series with $Z_2$, the solutions (11) through (19) set down hereinbefore for the non-dissipative gyrator may be converted into solutions for the dissipative gyrator simply by making the substitutions $(Z_1+A)$ for $Z_1$ and $(Z_2+D)$ for $Z_2$, with the following results:

$$\Delta=(Z_3+Z_1+A)(Z_2+Z_3+D)-(Z_3^2-C^2) \quad (20)$$

*Case I (dissipative)*

$$I_1=\frac{E_1(Z_2+D+Z_3)}{\Delta} \quad (21)$$

$$I_2=-\frac{E_1(Z_3+C)}{\Delta} \quad (22)$$

$$I_3=\frac{E_1(Z_2+D-C)}{\Delta} \quad (23)$$

*Case II (dissipative)*

$$I_1=-\frac{E_2(Z_3-C)}{\Delta} \quad (24)$$

$$I_2=\frac{E_2(Z_3+Z_1+A)}{\Delta} \quad (25)$$

$$I_3=\frac{E_2(Z_1+A+C)}{\Delta} \quad (26)$$

*Case III (dissipative)*

$$I_1=-\frac{E_3(Z_2+D+C)}{\Delta} \quad (27)$$

$$I_2=-\frac{E_3(Z_1+A-C)}{\Delta} \quad (28)$$

$$I_3=-\frac{E_3(Z_1+A+Z_2+D)}{\Delta} \quad (29)$$

In Case I (dissipative) in order to prevent transmission from $Z_1$ to $Z_3$ Equation 23 requires that C be equal to $(Z_2+D)$. This may not always be possible of realization. For example, in a Hall-effect gyrator made as disclosed in United States Patent No. 2,649,574 issued August 18, 1953 on application Serial No. 219,342 filed April 5, 1951, in the name of W. P. Mason, A and D were found each to be 20 ohms resistance and C was found to be 4.5 ohms resistance, so that C is considerably less than D and hence considerably less than $(Z_2+D)$. Hence, $I_3$ cannot be brought to zero.

In Case II (dissipative), where it is desired that there be no transmission from $Z_2$ to $Z_1$, the result is theoretically realizable the same as in the non-dissipative case by making $Z_3$ equal to C, as required by Equation 24.

In Case III (dissipative), however, in order to prevent transmission from $Z_3$ to $Z_2$, Equation 28 requires C be equal to $(Z_1+A)$. Here again the condition may not always be possible of fulfilment. For example, in the case of the Hall-effect gyrator hereinabove referred to, A is 20 ohms resistance and C is 4.5 ohms resistance, and C cannot be made to equal $(Z_1+A)$.

Hence, in the case of the dissipative gyrator it will be necessary to place some restriction on the particular circuit element to be connected to a given terminal of the gyrator to satisfy the requirements of a given situation in which the device of the invention is to be employed.

Furthermore, in the case of the dissipative gyrator, the theoretical maximum power transfer will generally not be realizable and impedance matching will not result in the best compromise for effecting greatest obtainable power transfer. For example, in Case II (dissipative), if $Z_3$ is equal to C, we then have in effect a generator of voltage $E_2$ and internal impedance $Z_2$ working into a load C through a series impedance D. For maximum power delivery to the load the generator impedance $Z_2$ should be made zero or as small as possible.

Fig. 4 shows diagrammatically an ideal gyrator 2 connected to three external elements $Z_1$, $Z_2$, $Z_3$, with an arrow 3 applied to the gyrator to indicate the direction of progression from each element to the next. The scheme of transmission is the same as shown in Fig. 3, the transmission of power being in the direction of the arrow and there being no transmission in the direction opposite to the arrow when the conditions set forth hereinabove can be met. In the case of the ideal gyrator, if no external element is to transmit in the direction opposite to the arrow, the impedances of all the elements $Z_1$, $Z_2$, $Z_3$, must individually satisfy the rule hereinabove formulated. In that case, it is found that there is maximum power transfer from $Z_1$ to $Z_2$, from $Z_2$ to $Z_3$, and from $Z_3$ to $Z_1$.

In some cases, less than complete suppression of transmission from every element to the next in the direction opposite to the arrow is satisfactory and accordingly not all the elements $Z_1$, $Z_2$, $Z_3$ need match the transfer impedance of the gyrator even where the gyrator is non-dissipative.

By application of the principle of duality the star connection of the elements $Z_1$, $Z_2$, $Z_3$, in Figs. 2 and 4 may be replaced by a delta connection.

While the gyrator of Fig. 2 is represented as a T-network and terminals 86 and 88 are connected together, the gyrator can instead be represented as an H-network, and, by employing the principle of duality or in other known ways, variations of the arrangement of Fig. 2 may be devised some of which do not involve a short circuit between any two of the gyrator terminals, while resulting in three accessible coupling facilities to which external transmission paths $Z_1$, $Z_2$, $Z_3$, may be connected as in Fig. 2.

In the case of the two-way repeater arrangement using two one-way amplifiers, the prevention of singing, as aforementioned, necessitates that there be substantially no transmission from the output of one amplifier to the input of the other. By the terms of the above-stated rule where transmission is to be permitted from the output of one amplifier to the transmission line but is to be prevented from the output of that amplifier to the input of the other amplifier, the impedance of the transmission line must be made conjugate to the transfer impedance of the gyrator. The first amplifier output, the transmission line, and the second amplifier input must be connected in the order of progression peculiar to the gyrator that is used to connect them, and in the case of a dissipative gyrator it may be necessary that the transmission line be connected in the position of $Z_3$ (Fig. 2) to prevent singing.

Fig. 5 shows the general scheme of connection of two one-way amplifiers between two transmission lines or line sections by means of two gyrators in accordance with the invention. Line No. 1 is to be connected to terminals 4 and 5. Gyrator No. 1 is shown schematically as an equilateral triangular box 6 with three terminals 7, 8, 9, arranged in cyclical, counter-clockwise order of progression as indicated by an arrow 10. An amplifier 11 to supply amplified waves to line No. 1 is shown together with an amplifier 12 to supply amplified waves to line No. 2, the latter line to be connected to terminals 13 and 14. The gyrator terminals 7, 8, 9 of gyrator No. 1 are shown connected respectively to the output terminal 15 of amplifier 11, the terminal 4 for connection to one side of line No. 1, and the input terminal 17 of amplifier 12. The remaining terminals 16, 5, 18, of amplifier 11, line No. 1, and amplifier 12, respectively, are connected together.

The second gyrator is shown schematically as a triangular box 19 with terminals 20, 21, 22, in cyclical, counterclockwise order of progression as indicated by an arrow 23. The terminals 20, 21, 22, of gyrator No. 2 are shown connected respectively to the output terminal 24 of amplifier 12, the terminal 13 for connection to one side of line No. 2, and the input terminal 26 of amplifier 11. The remaining terminals 25, 14, 27, of amplifier 12, line No. 2, and amplifier 11, respectively, are connected together.

Each of the gyrators may be described as a non-reciprocal coupler.

In accordance with the invention, gyrator No. 1 enables the output circuit of the amplifier 11, when energized, to transmit into line No. 1 and enables line No. 1, when energized, to transmit to the input circuit of the amplifier 12. In order to reduce or prevent transmission from the output circuit of amplifier 11 to the input circuit of amplifier 12 it is necessary to make the impedance of line No. 1 conjugate to the transfer impedance of gyrator No. 1. There are available various techniques for making the impedance of a transmission line and the impedance of another device such as a balancing network conjugate, including the use of impedance matching transformers, compensating networks, etc. These techniques being well known are not particularly illustrated herein in order not to unnecessarily complicate the drawings.

If desired, use may be made of additional properties of the network of Fig. 2 in the system of Fig. 5, or elsewhere, by providing conjugacy of impedances in either two or all three of the possible cases involving $Z_1$, $Z_2$, $Z_3$ and C. An important property of the network is maximum power transfer from one circuit branch to another. It will be evident that if maximum power is transferred from a source associated with $Z_1$ to $Z_2$, for example, there must be no power transferred by the source to $Z_3$. It has already been demonstrated hereinabove that if no power is to be transferred from the source associated with $Z_1$ to $Z_3$, it is necessary to make the impedance $Z_2$ conjugate to the transfer impedance C of the gyrator. Thus, for maximum power transfer from a source associated with $Z_1$ to $Z_2$ it is necessary to make $Z_2$ and C conjugate, otherwise some power is lost by absorption in $Z_3$. Assuming now that this conjugacy has been effected, the substitution of C for $Z_2$ may be made in Equations 10 and 12, with the result that $$\Delta = Z_1C + ZC_3 + Z_3Z_1 + C^2$$

$$= (Z_1 + C)(Z_3 + C) \quad (30)$$

$$I_2 = -\frac{E_1}{Z_1 + C} \quad (31)$$

from which it appears that $I_2$ is independent of $Z_3$ and hence in the present case the network branch containing $Z_3$ may be opened or removed without affecting the relationships between $Z_1$ and $Z_2$. In other words, the value of $Z_3$ is immaterial in this connection. The effective circuit is then that of a generator of electromotive force $E_1$ and internal impedance $Z_1$ sending the current $I_2$ into a load impedance of C. Thus, for maximum power transfer it is evidently necessary to make the impedance of $Z_1$ conjugate to C and hence to make both $Z_1$ and $Z_2$ conjugate to C. If in any case C is a pure resistance, then impedance matching is all that is needed to secure conjugacy, as will be understood by those versed in the art.

If, on the other hand, it is desired to have maximum power transfer from $Z_2$ to $Z_3$, there must be no power transfer from $Z_2$ to $Z_1$ and hence $Z_3$ must be conjugate to C and by substitution of C for $Z_3$ in Equations 10 and 16 it follows that $Z_2$ must also be conjugate to C.

Without further detailed analysis it is evident that if $Z_1$, $Z_2$ and $Z_3$ are each conjugate to C, the network of Fig. 2 will effect maximum power transfer from each branch to the next in cyclical order, while allowing no power transfer in the reverse direction.

In the illustrative example of a two-way repeater arrangement as in Fig. 5, if the impedance of line No. 1 is conjugate to the transfer impedance of gyrator No. 1, and no other impedance conjugacies are effected, the output circuit of amplifier 11 will not transmit to the input circuit of amplifier 12 and hence self-oscillations of the amplifiers will be prevented. The output circuit of amplifier 11 will transmit into line No. 1 and line No. 1 will transmit into the input circuit of amplifier 12 though the transmission in either case will be less than the maximum possible. If in addition the impedance of the output circuit of amplifier 11 is conjugate to line No. 1, there will be maximum power transmission from amplifier 11 to line No. 1, a condition which is usually of prime importance from the standpoint of efficiency. Of somewhat less importance in some respects is the matter of maximum power transfer from the line to the input of the receiving amplifier (12 in this case). The input circuit of an amplifier usually being substantially voltage actuated and absorbing a negligible amount of power will generally operate most efficiently when the input impedance of the amplifier is as large as possible compared to the line, in which case maximum power output will not be desired. On the other hand, a mismatch of impedance between the line and the amplifier input will cause an echo wave to arise which will be transmitted through the gyrator to the output circuit of the transmitting amplifier. Here the echo might cause distortion of the transmitted signals, or if again reflected by some mismatch in the amplifier output circuit the echo may be transmitted to the line with deleterious results. Accordingly, circumstances in practice may or may not make it advisable to make the line impedance conjugate to the input impedance of the receiving amplifier.

For the prevention of self-oscillation in the repeater it will generally be advisable also to prevent transmission from the output circuit of amplifier 12 to the input circuit of amplifier 11 by making the impedance of line No. 2 and the transfer impedance of gyrator No. 2 conjugate. For efficiency, also, it will be advisable to make the output impedance of amplifier 12 and the impedance of line No. 2 conjugate.

Figure 6:
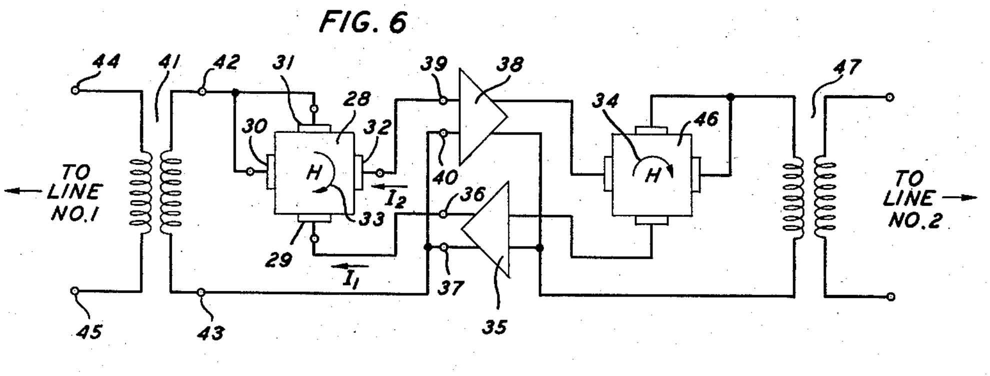
Fig. 6 is a particular form of the repeater arrangement of Fig. 5 using a four-electrode antireciprocal interconnector.

Fig. 6 shows a repeater in accordance with the circuit of Fig. 5 using a particular form of gyrator. The gyrator 28 is of the type disclosed by W. P. Mason in application Serial No. 219,342, filed April 5, 1951, and assigned to the assignee of the present application, now Patent No. 2,649,574, issued August 18, 1953. The gyrator is a Hall-effect unit comprising a body of semiconductive material in the form of a rectangular hexahedron of square cross section with respective rectangular electrodes on four equal faces thereof. The unit is represented schematically in Fig. 6 by a square having electrodes 29, 30, 31, 32, on the respective sides. The device is rendered into a three-terminal device by a common connection of two adjacent electrodes, for example 30 and 31, in which case the three terminals may be taken as 29, 30, and 32. A definite direction of progression is impressed upon the gyrator 28 by application of a steady magnetic field in the direction parallel to the surfaces of the electrodes, which direction is perpendicular to the plane of the drawing. The field is indicated schematically by the symbol H. Reversal of the direction of the field H will reverse the direction of progression in the gyrator. As shown, it is assumed that the progression is clockwise as indicated by the arrow 33 as well as the order of application of the reference numerals 29, 30, 32, to the electrodes.

Electrodes 29 and 31 correspond to one of the pairs of electrodes 85, 86 and 87, 88 of the device in the box 1 in Fig. 2. Electrodes 30 and 32 correspond to the other pair of electrodes 87, 88 or 85, 86.

In accordance with the known properties of a Hall-effect device, when the steady magnetic field H is present, an electromotive force impressed between the terminals 29 and 31 causes an electromotive force to appear between the terminals 30 and 32 with a definite polarity depending upon the polarity of the impressed electromotive force and the direction of the steady magnetic field. Likewise, an electromotive force impressed between the terminals 30 and 32 causes an electromotive force to appear between the terminals 29 and 31 with a definite polarity depending upon the polarity of the impressed electromotive force and the direction of the steady magnetic field.

To determine whether the device 28 is reciprocal or antireciprocal, a convention may be adopted with regard to the polarities of the voltages $V_1$ and $V_2$ and the directions of the currents $I_1$ and $I_2$ of Equations 3 and 4. For this purpose let it be assumed that the current $I_1$ flows into the terminal 29 and that the current $I_2$ flows into the terminal 32. $V_1$ is positive when terminal 29 is at a higher potential than terminal 31 and $V_2$ is positive when terminal 32 is at a higher potential than terminal 30. If now the polarity of the steady magnetic field H is such that current $I_2$ entering device 28 from terminal 32 goes to terminal 29 rather than to terminal 31, terminal 29 develops a higher potential than terminal 31 and, by the convention above stated, $V_1$ is positive. Hence the device has a positive value of transfer impedance relating $I_2$ and $V_1$. With the same polarity of H, current $I_1$ entering the device from terminal 29 goes to terminal 30 rather than to terminal 32 and hence terminal 30 develops a higher potential than terminal 32. Hence, by the convention, $V_2$ is negative and the device has a negative value of transfer impedance relating $I_1$ and $V_2$. The device 28 is thus shown to be governed as to the algebraic signs of its transfer impedances in accordance with Equations 3 and 4 and is thereby characterized qualitatively as an antireciprocal device. If the amplitudes of the transfer impedances are equal the device satisfies Tellegen's criterion for antireciprocity.

In accordance with the scheme of connections shown in Fig. 5, the three-terminal device 28 of Fig. 6 has terminal 29 connected to output terminal 36 of an amplifier 35; terminal 30 connected to terminal 42 of one winding of an impedance transforming transformer 41 in turn connected to line No. 1; and terminal 32 connected to input terminal 39 of an amplifier 38. The remaining output terminal 37 of amplifier 35, the remaining input terminal 40 of amplifier 38, and the terminal 43 of transformer 41 are connected together. The terminals 44 and 45 of the other winding of the transformer 41 are for connection to line No. 1. The output terminals of amplifier 38 and the input terminals of amplifier 35 are connected with a second gyrator 46 characterized by clockwise arrow 34 and a second transformer 47 associated with line No. 2 in a similar manner to that described in connection with the output terminals of amplifier 35, input terminals of amplifier 38, gyrator 28 and transformer 41 as will be evident to those skilled in the art. The transformers 41 and 47 are useful in matching the impedances of the lines to the transfer impedances of the respective gyrators.

If the impedances A and D of the Hall-effect gyrator are sufficiently small compared to C so that substantially null current values can be realized for $I_3$ in Equation 23 and for $I_2$ in Equation 28, then the particular permutation of the connections of the line and the amplifiers to the respective terminals of the gyrator is immaterial. Where the null values of $I_2$ and $I_3$ cannot be realized, the permutation shown in Fig. 6, where the amplifier output terminal 36 is connected to terminal 29, the line to terminal 30, and the amplifier input terminal 39 to terminal 32 is the only one of the three permutations of the specified cyclical order of progression that will serve to prevent transmission from the output circuit of amplifier 35 to the input circuit of amplifier 38, and hence is the only permutation that will prevent singing. It will be noted that this permutation is the one in which the common connection from terminals 30 and 31 of the gyrator goes to the line, i.e., the line is in the relative position occupied by $Z_3$ in the circuit of Fig. 2.

Figure 7:
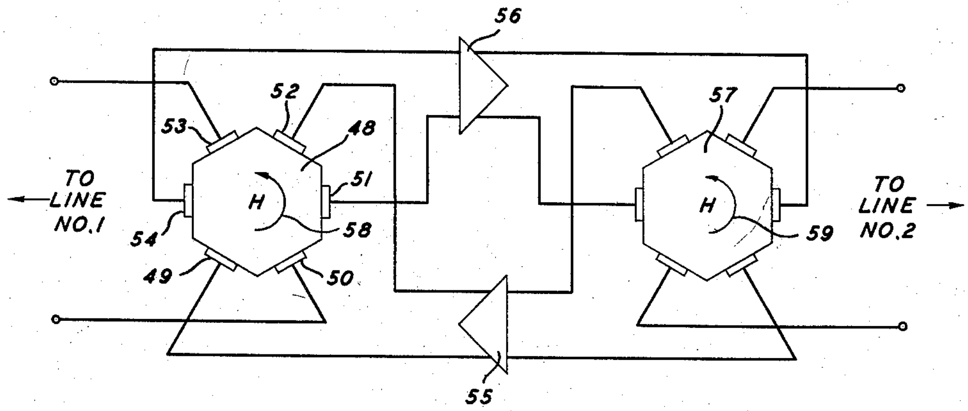
Fig. 7 is a particular form of the repeater arrangement of Fig. 5 using a six-electrode non-reciprocal interconnector.

Fig. 7 shows a repeater in accordance with the circuit of Fig. 5 using another form of non-reciprocal interconnecting device. The device used is one disclosed by C. L. Semmelman in application Serial No. 307,263, filed August 30, 1952, now Patent 2,774,890, granted December 18, 1956, and assigned to the assignee of the present application. The Semmelman device is a Hall-effect unit somewhat similar to that disclosed by Mason, supra, but having six electrodes arranged on the respective faces of a hexagonal prism instead of four electrodes arranged on the respective faces of a square prism. The Semmelman device 48 is represented schematically in Fig. 7 by a hexagon having electrodes 49, 50, 51, 52, 53, 54, on the respective sides. The device 48 thus has three pairs of terminals whereas the devices 1 and 28 above considered each have essentially three single terminals. The terminal pairs are 49, 52; 50, 53; and 51, 54. There is a definite cyclical order of progression here as with the devices 1 and 28, and it is determined by the application of a particular polarity of steady magnetic field in the direction parallel to the surfaces of the electrodes, which direction is perpendicular to the plane of the drawing. The field is indicated schematically by the symbol H. Reversal of the direction of the field H will, as before, reverse the direction of progression. As shown, the progression is from pair 49, 52, to pair 50, 53, to pair 51, 54 to pair 49, 52, and so on, as indicated schematically by an arrow 58. Transmission in the direction opposite to the arrow is substantially suppressed and because of this suppression the device 48 is designated as non-reciprocal. The device is not antireciprocal. The three pairs of terminals or electrodes define three substantially one-way current paths through the respective Hall-effect devices.

In the arrangement of Fig. 7, amplifiers 55 and 56 are connected between line No. 1 and line No. 2 through the non-reciprocal device 48 and a similar such device 57. The output terminals of amplifier 55 are connected respectively to the terminals 49 and 52 of the device 48. The terminals 50 and 53 of device 48 are for connection to the respective conductors of line No. 1. The input terminals of amplifier 56 are connected respectively to the terminals 51 and 54 of device 48. As thus connected, the output of amplifier 55 transmits to line No. 1, and the line transmits to the input of amplifier 56. The device 48 may be adjusted to substantially block transmission from the output of amplifier 55 to the input of amplifier 56. Similar connections are made with respect to the output of amplifier 56, the input of amplifier 55, line No. 2, and the device 57 in which latter the direction of progression is indicated by the arrow 59.

The prevention of transmission in the direction opposite to the arrow in the device 48 or 57 of Fig. 7 is not dependent upon any impedance relationship between the internal impedances of the device 48 or 57 and the impedances of the devices to be interconnected in the system of Fig. 7. The transmission properties and the degree of suppression of transmission are inherent in the device 48 or 57 itself and these properties are more particularly described in the Semmelman application. The particular permutation of connections to the Semmelman device is not important provided the desired order of cyclical progression is preserved.

Where a gyrator is to be operated at very high frequencies the coupling facilities for connecting external elements to the gyrator may be in the form of dielectric wave guides the use of which is well known in the art.

The accessible facilities, points, or regions for coupling external transmission paths with the non-reciprocal coupler, of whatever form or nature, are to be understood as covered by the terms "coupling facilities" or simply "ports."

It is to be understood that the above-described arrangements are illustrative of the application of the principles of the invention. Numerous other arrangements may be devised by those skilled in the art without departing from the spirit and scope of the invention.

What is claimed is:

1. A repeater arrangement comprising a four-terminal Hall-effect device comprising a body of semiconductive material in the form of a prism having substantially equal cross-sectional dimensions and two pairs of terminals on the side faces thereof, the terminals on two adjacent side faces being connected in common, a transmission line having an impedance substantially conjugate to the transfer impedance of said Hall-effect device and one terminal connected to said common terminals of the Hall-effect device, first and second one-way amplifiers each having an input circuit and an output circuit, one terminal of the output circuit of the first amplifier and one terminal of the input circuit of the second amplifier being connected respectively to the non-common terminals of the Hall-effect device, the remaining terminals of the line, of the output circuit of the first amplifier and of the input circuit of the second amplifier being connected together, and means for impressing a steady magnetizing field upon said Hall-effect device in the direction to substantially suppress transmission from the output circuit of the first amplifier to the input circuit of the second amplifier.

2. A repeater arrangement comprising a Hall-effect device having four terminals of which two are directly connected together, a transmission line having an impedance conjugate to the transfer impedance of said device and one side of which is connected to the two directly connected Hall-effect device terminals, a first amplifier including two output terminals one of which is connected to one of the remaining terminals of the Hall-effect device, a second amplifier including two input terminals one of which is connected to the fourth terminal of the Hall-effect device, the other side of the transmission line being connected to the remaining above-mentioned amplifier terminals, and means to substantially suppress transmission through the Hall-effect device from the output terminals of the first amplifier to the input terminals of the second amplifier.

3. A repeater arrangement comprising a gyrator having four terminals two of which are directly connected together forming three effective terminals, and a transmission line the impedance of which is substantially the conjugate of the transfer impedance of said gyrator, and first and second amplifiers each having an input circuit and an output circuit; the output circuit of the first amplifier, the line, and the input circuit of the second amplifier each having a terminal connected respectively to one of the three effective terminals of the gyrator, said gyrator being poled to substantially suppress transmission from the output circuit of the first amplifier to the input circuit of the second amplifier.

4. A repeater arrangement in accordance with claim 3, in which the line terminal that is connected to the gyrator is connected to the two gyrator terminals that are directly connected together.

5. A three-circuit switching system comprising a gyrator having two pairs of accessible terminals of which one terminal of one pair is common to one terminal of the other pair whereby there are essentially only three accessible terminals, said terminals defining first and second circuit meshes between the common terminal and the respective non-common terminals, for which gyrator the value of the transfer impedance for transfers from the first circuit mesh to the second circuit mesh is substantially the negative of the transfer impedance for transfers from the second circuit mesh to the first circuit mesh, and means connecting first, second, and third external circuits between the respective three accessible terminals of the gyrator and a common junction point external to the gyrator, which external circuits are to be switched.

6. A system in accordance with claim 5, in which each of the said external circuits is equal in self-impedance to the magnitude of the transfer impedance of the gyrator, whereby an electromotive force in the first external circuit activates the second external circuit but not the third, an electromotive force in the second external circuit activates the third external circuit but not the first, and an electromotive force in the third external circuit activates the first but not the second.

7. The combination of a gyrator with a given value of antireciprocal transfer impedance and with essentially only three accessible terminals, a common junction for branch circuits located externally to said gyrator, first, second, and third branch circuits connected between said common junction and the respective accessible terminals of the gyrator, each said branch circuit having its impedance matched to the antireciprocal transfer impedance of the gyrator, whereby the gyrator connects the said first branch circuit to said second branch circuit, the second to the third, and the third to the first, while substantially preventing transmission from the third to the second, the second to the first, and the first to the third.

8. The combination of a gyrator having three accessible terminals and a given value of antireciprocal transfer impedance, a common conductor external to said gyrator, and first, second, and third circuit branches external to said gyrator, each said circuit branch extending from said common conductor to a respective one of said gyrator terminals, and each said circuit branch being matched in impedance to the antireciprocal transfer impedance of the gyrator, whereby a wave applied to the first said circuit branch will produce a related wave in the second said circuit branch but not in the third, a wave applied to the second will produce a related wave in the third but not in the first, and a wave applied to the third will produce a related wave in the first but not in the second.

9. A repeater arrangement comprising a Hall-effect device having a plurality of electrodes and means defining only first, second, and third substantially one-way transmission paths between electrodes, a transmission line having a pair of terminals, a first one-way amplifier having a pair of output terminals connected to said line terminals through said first one-way transmission path in the direction from the amplifier output to the line, a second one-way amplifier having a pair of input terminals, said input terminals being connected to the said line terminals through said second one-way transmission path in the direction from the line to the amplifier input, the first amplifier output terminals being connected to the second amplifier input terminals through said third one-way transmission path in the direction from the second amplifier input to the first amplifier output, whereby transmission from the first amplifier output to the second amplifier input is substantially avoided, together with a second transmission line having a pair of terminals and a second Hall-effect device having a plurality of electrodes and defining only first, second, and third substantially one-way transmission paths between electrodes, the said second one-way amplifier having a pair of output terminals connected to said terminals of the said second transmission line through the said first one-way path of the said second Hall-effect device in the direction from the amplifier output to the line, the said first one-way amplifier having a pair of input terminals connected to the said terminals of the said second transmission line through the said second one-way transmission path of the said second Hall-effect device in the direction from the line to the amplifier input, the second amplifier output terminals being connected to the first amplifier input terminals through said third one-way transmission path of the said second Hall-effect device in the direction from the first amplifier input to the second amplifier output, whereby transmission from the second amplifier output to the first amplifier input is substantially avoided.

10. A repeater arrangement comprising a Hall-effect device having a plurality of electrodes and means defining first, second, and third internal transmission paths between said electrodes, a transmission line having a pair of terminals and an impedance which is substantially the conjugate of the transfer impedance of said device, a first one-way amplifier having a pair of output terminals connected to said line terminals through said first internal transmission path, the second one-way amplifier having a pair of input terminals, said input terminals being connected to the said line terminals through said second internal transmission path, the first amplifier output terminals being connected to the second amplifier input terminals through said third internal transmission path, and means determining the sense of the antireciprocal coupling in the Hall-effect device, whereby transmission from the first amplifier output to the second amplifier input is substantially avoided.

11. A repeater arrangement comprising a gyrator having essentially only three electrodes and means defining first, second, and third internal transmission paths between said electrodes, a transmission line having a pair of terminals and an impedance which is substantially the conjugate of the transfer impedance of said gyrator, a first one-way amplifier having a pair of output terminals connected to said line terminal through said first internal transmission path, a second one-way amplifier having a pair of input terminals, said input terminals being connected to said line terminals through said second internal transmission path, the first amplifier output terminals being connected to the second amplifier input terminals through said third internal transmission path, and means determining the sense of the antireciprocal coupling in the gyrator, whereby transmission from the first amplifier output to the second amplifier input is substantially avoided.

References Cited in the file of this patent

UNITED STATES PATENTS

| | | |
|---|---|---|
| 2,169,360 | Kimmel | Aug. 15, 1939 |
| 2,496,266 | Brode et al. | Feb. 7, 1950 |
| 2,629,024 | Edwards | Feb. 17, 1953 |
| 2,647,239 | Tellegen | July 28, 1953 |
| 2,649,574 | Mason | Aug. 18, 1953 |
| 2,697,759 | Tellegen | Dec. 21, 1954 |
| 2,748,353 | Hogan | May 29, 1956 |
| 2,774,890 | Semmelman | Dec. 8, 1956 |

OTHER REFERENCES

Terman text, "Radio Engineering," 3d ed., pages 73, 74, 104, pub. 1947 by McGraw-Hill Book Co., N.Y.C. (Copy in Div. 69.)